Feb. 21, 1967 R. A. MUNSE 3,304,686

PLASTIC MOLDING FASTENER

Filed June 22, 1964

INVENTOR.
ROBERT A. MUNSE
BY
Fraser & Fraser
ATTORNEYS

3,304,686
PLASTIC MOLDING FASTENER
Robert A. Munse, Perrysburg, Ohio, assignor to The Bishop and Babcock Corporation, Toledo, Ohio, a corporation of Ohio
Filed June 22, 1964, Ser. No. 377,014
1 Claim. (Cl. 52—718)

This invention relates to clips or fasteners for attaching moldings to a supporting body, such as an automobile, and more particularly where dissimilar metals are employed such that by electrolytic action corrosion is caused. Decorative molding strips are usually of one metal, such as aluminum or stainless steel, and the fastener for attaching these strips and the body to which the strips are attached are of a different metal, such as carbon steel, and due to weather conditions an electrolytic action takes place which results in corrosion, a most undesirable and objectionable situation. These molding strips not infrequently are of a relatively light gauge metal and, unless precaution is taken, rattling and annoying vibrational noises occur.

An object is to overcome the above objectionable features and to produce a new and improved molding fastener which not only eliminates the corrosion difficulty but imposes spring tension on the molding clip in such manner as to eliminate vibrational noises.

Another object is to produce a plastic molding clip having the novel features of construction and assembly for the prevention of corrosion and the elimination of rattles and which is inexpensive to manufacture and easy to install.

Figure 1:
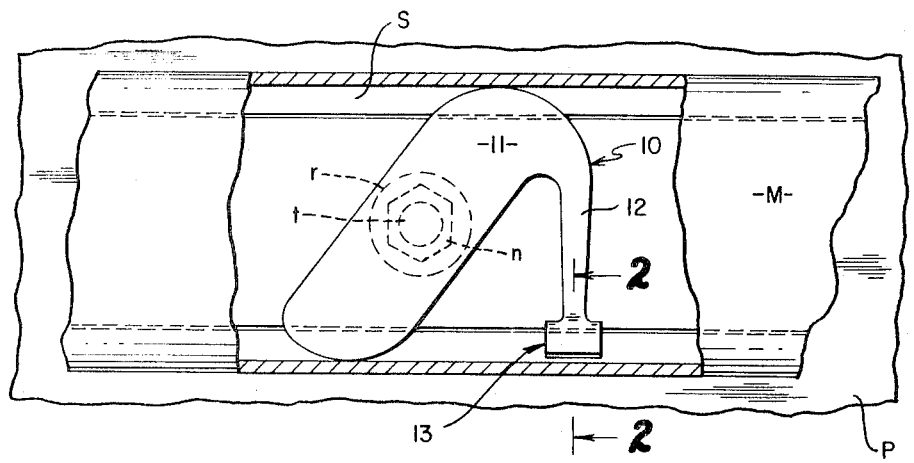
Figure 2:
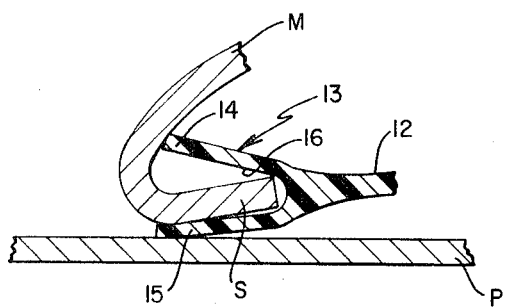
Figure 3:
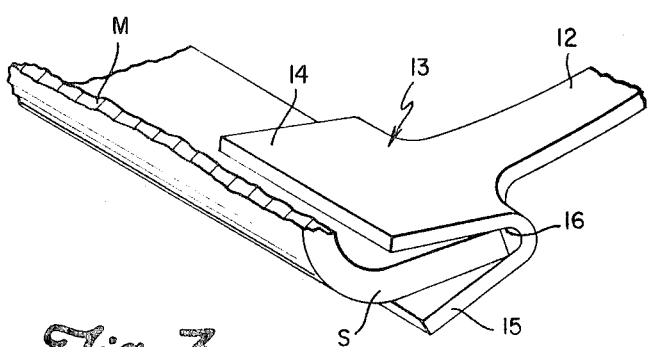

Other objects and advantages of the invention will hereinafter appear and, for purposes of illustration but not of limitation, an embodiment of the invention is shown on the accompanying drawings, in which FIGURE 1 is an enlarged transverse sectional view of a decorative molding and a clip or fastener for attaching it to a body panel shown in fragmentary section;

FIGURE 2 is an enlarged fragmentary sectional view on the line 2—2 of FIGURE 1; and FIGURE 3 is an enlarged fragmentary view of one of the arms of the molding clip and a fragment of the molding, showing the manner in which the inturned edge flanges of the molding are engaged by the ends of the molding clip.

The illustrated embodiment of the invention comprises a hollow longitudinally extending molding M of a corrosive metal, having inturned side edge flanges indicated at S, which are spaced from the body of the molding. The molding is connected by a series of clips or fasteners 10 to the metallic automobile body panel P by a threaded shank $t$ having a nut $n$, the threaded shank extending through an aperture in the panel P and the head $r$ of the shank being suitably secured to the body 11 of the fastener 10. The molding fastener is of one piece construction, the body 11 being in the form of a rigid cross plate having two diagonally opposite rounded corners. A molding engaging arm 12 is of elongated form and is flexibly resilient throughout its length with an enlarged spade-like head 13 at the outer end of greater dimensional stability with flaps 14 and 15 possessing sufficient resilience for the purpose intended. As shown the arm 12 is integral at one end with the body 11 at one side thereof adjacent a non-rounded corner and extends therefrom in the same plane as and in the direction of the opposite end of the body 11 and in spaced relation thereto. The arm curves outwardly of the body but the greater portion of the length is approximately straight.

The spade-like head 13, which forms a T with the adjacent arm, consists of an upwardly inclined tongue-like flap 14 and a downwardly inclined tongue-like flap 15, which form an angle therebetween of the order of 30°. The flaps provide a recess or cavity 16 therebetween to receive the respective side edge flange S of the molding strip M. The lower flap 15 is interposed between the upper surface of the automobile body panel P and the inturned edge flange S of the molding thereby preventing the flange from contacting the body panel. The flap 14, which inclines upwardly, impinges against the under side of the molding M and exerts yielding pressure against same for militating against rattles or vibrational noises.

Except for the threaded shank $t$, the molding clip 10 is of plastic material and particularly such material which has a certain springiness or resilience for the purpose. The material of the clip is non-conductive and may be of material such as nylon, polypropylene or polycarbonate. Thus it will be understood that either a thermoplastic or a thermoset may be used in this connection. Although the plastic material should be sufficiently flexible and resilient for the purpose and such that will not scratch the finish of the automobile panel P, it may have a certain degree of brittleness so that when the nut $n$ is tightened the flap 15 may be fractured. So long as a portion of the flap 15 is disposed between the edge flange S and the body panel P the desired insulation against corrosion is provided.

The series of fasteners 10 are assembled to the molding strip by inserting them in longitudinal fashion through the space between the inturned edge portions S and thereafter turning them partially crosswise or to a position as indicated in FIGURE 1, after which the assembly is tightened by turning up the nuts $n$ on the threaded shank $t$. The longitudinal dimension of the fasteners 10 may be slightly greater than the space between the molding flanges S, so that when the fasteners are turned to the position of use, they are under pressure.

Numerous changes in details of construction, arrangement and choice of materials may be effected without departing from the spirit of the invention, especially as defined in the appended claim.

What I claim is:

A molding attachment assembly comprising, in combination, a hollow longitudinally extending molding having spaced inturned longitudinal flanges, and an attaching fastener for connecting said molding to a supporting panel, said fastener having a body adapted to be rocked to a position crosswise with respect to said flanges, an arm having an end integral with the end portion of said body, a pair of integral flaps of resilient plastic material at the free end of said arm, one flap inclining upwardly for imposing upward pressure against the under side of the molding and the other flap being disposed between the respective molding flange and the supporting panel, said flaps forming therebetween a recess or cavity into which the respective molding flange projects when the body is rocked to said position, and means for securing said fastener body to a supporting panel.

References Cited by the Examiner
UNITED STATES PATENTS
3,141,209   7/1964   Van Buren _____ 24—73
FOREIGN PATENTS
932,270   7/1963   Great Britain.

RICHARD W. COOKE, Jr., *Primary Examiner.*